DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 400

T914,009

STABILIZATION OF POLYMERS FOR WIRE AND CABLE APPLICATIONS

Wade H. Brown, 307 W. 90th St., New York, N.Y. 10034; and Joseph M. Farber, 28 Braddock Court; and Peter P. Klemchuk, 148 Upland Road, both of Yorktown Heights, N.Y. 10598

Filed Dec. 4, 1972, Ser. No. 312,079

Int. Cl. C08f *45/58*

U.S. Cl. 260—45.85 B

No Drawing. 40 Pages Specification

Polyolefin compositions, protected against metal induced oxidation such as incurred by copper, contain as the stabilizer system therefor a phenol antioxidant, a nitrogenous metal deactivator and a thiodiacid ester synergist. Exemplary of such compounds are pentaerythritol tetrakis-[3 - (3′,5′ - di-t.butyl-4′-hydroxyphenyl)propionate], 2,2′-thiodiethanol di-β-(3,5-di-t-butyl - 4 - hydroxylphenyl)propionate, oxanilide, N,N′-di-acetyladipic acid dihydrazide and dilauryl thiodipropionate.

Their improved oxidation resistivity renders them particularly suitable for wire and cable insulation.